US012795371B2

(12) United States Patent
Gehani et al.

(10) Patent No.: US 12,795,371 B2
(45) Date of Patent: Nov. 10, 2026

(54) SYSTEMS AND METHODS FOR ISOLATION OF APPLICATION SERVICES IN A NETWORK ENVIRONMENT

(71) Applicant: SRI International, Menlo Park, CA (US)

(72) Inventors: Ashish Gehani, Atherton, CA (US); Vinod Trivandrum Yegneswaran, Foster City, CA (US); Phillip Andrew Porras, Cupertino, CA (US)

(73) Assignee: SRI International, Menlo Park, CA (US)

( * ) Notice: Subject to any disclaimer, the term of this patent is extended or adjusted under 35 U.S.C. 154(b) by 119 days.

(21) Appl. No.: 18/748,496

(22) Filed: Jun. 20, 2024

(65) Prior Publication Data

US 2024/0430685 A1 Dec. 26, 2024

Related U.S. Application Data

(60) Provisional application No. 63/522,038, filed on Jun. 20, 2023.

(51) Int. Cl.
*H04L 29/06* (2006.01)
*H04W 12/122* (2021.01)

(52) U.S. Cl.
CPC ................................ *H04W 12/122* (2021.01)

(58) Field of Classification Search
CPC .................................................. H04W 12/122
See application file for complete search history.

(56) References Cited

U.S. PATENT DOCUMENTS

2019/0020985 A1* 1/2019 Dai ......................... H04W 8/26
2022/0007194 A1* 1/2022 Shaw ...................... H04L 63/20

OTHER PUBLICATIONS

"Arpanet," Wikipedia, 2024, 24 pages.
"What are data provenance graphs?" Educative, www.educative.io/answers/what-are-data-provenance-graphs, 2024, 4 pages.
Abbas et al. "PACED: Provenance-based Automated Container Escape Detection," 10th IEEE International Conference on Cloud Engineering, 2022, 12 pages.
Ashish-Gehani, "Spade," https://github.com/ashish-gehani/SPADE/blob/master/src/spade/reporter/Audit.java, 2024, 58 pages.

(Continued)

*Primary Examiner* — Wasika Nipa
(74) *Attorney, Agent, or Firm* — McDonnell Boehnen Hulbert & Berghoff LLP

(57) ABSTRACT

An example method for identifying one or more potential malicious activities in a software-defined open radio access network includes detecting, by a trusted monitoring device, a communication flow from a sender component to a receiver component via an intermediate component. The method also includes, in response to the detecting of the communication flow, generating, by the trusted monitoring device and utilizing an intermediate identifier associated with the intermediate component, a flow record based on one or more parameters associated with the communication flow. The method further includes providing, by the trusted monitoring device and based on the flow record, an indication of the one or more potential malicious activities in the software-defined open radio access network.

23 Claims, 8 Drawing Sheets

(56) References Cited

OTHER PUBLICATIONS

Chen et al., "CLARION: Sound and Clear Provenance Tracking for Microservice Deployments," Proceedings of the 30th USENIX Security Symposium, Aug. 11-13, 2021, 19 pages.
Irshad et al., "TRACE: Enterprise-Wide Provenance Tracking for Real-Time APT Detection," IEEE Transactions on Information Forensics and Security, 2021, 14 pages, vol. 17.
Kurbernetes, Overview, https://kubernetes.io/docs/home/, 2024, 4 pages.
Pasquier et al., "Practical Whole-System Provenance Capture," 8th ACM Symposium on Cloud Computing, 2017, 14 pages.
Pasquier, Thomas, "CamFlow Project," www.camflow.org, Sep. 5, 2023, 27 pages.
Singh et al., "What is the 5G Service-Based Architecture (SBA)?" Microsoft, May 2,5, 2023, 7 pages.

* cited by examiner

SYSTEMS AND METHODS FOR ISOLATION OF APPLICATION SERVICES IN A NETWORK ENVIRONMENT

CROSS-REFERENCE TO RELATED APPLICATIONS

This application claims priority to U.S. Provisional Patent Application No. 63/522,038, titled "xIM: xApp Isolation Monitor," filed on Jun. 20, 2023, which is hereby incorporated by reference in its entirety.

GOVERNMENT LICENSE RIGHTS

This invention was made with Government support under grant number 2226443 awarded by the National Science Foundation. The Government has certain rights in this invention.

BACKGROUND

A network environment may include application services that communicate with one another based on network protocols. For example, software-defined networks such as higher generation cellular networks (e.g., fifth-generation (5G), sixth-generation (6G), or higher generation networks) provide an open platform and interoperability, and enable programmability that allows stakeholders (e.g., network operators) and researchers to configure software-defined services for the network. As another example, a microservices architecture may involve an application arranged as a collection of services that are coupled together to communicate over a communication interface based on lightweight protocols.

SUMMARY

Application services in a network environment may communicate with one another. For example, a service model may involve communication flow from one application to another in an exchange of information related to a particular service. Generally speaking, the applications within such services may exchange service model messages. For example, a first application may send a service model message to a second application. One example protocol may involve an intermediate component, such as a socket or a memory resource that is configured to receive the service model message and make it available to the second application.

In one example of a network environment, services in a microservices architecture may include processes that communicate over a network. For example, such services may be configured to enable business protocols in a business environment. Such services may be implemented using a variety of programming languages, and may involve databases, data lakes, and/or hardware and software resources. The services may be implemented within a local network, or may be distributed across remote servers and/or computing systems. Various applications within the services may exchange data. The applications may be structured based on virtualized components such as containers. The flow of data may occur via sockets, intermediate components (e.g., memory resources), and so forth.

Another example of a network environment may be software-defined networks. Software-defined networks are generally configured to disaggregate the control and data management functions of the cellular network into layers, such as (a) a network layer (also referred to herein as a data plane) that provides the base-station functions of radio frequency (RF) transmission, link establishment and authentication, and communication flow management, and (b) a control layer (also referred to herein as a control plane) segregated to a centrally governed cloud ecosystem that provides a vendor neutral framework for integrating control and management functions for one or more base stations. Software-defined networks may be configured to support cell stations and/or base stations that can be modularly decomposed into a Radio Unit (RU), Data Unit (DU), and Control Unit (CU).

Such software-defined networks have programmable components. For example, the control plane logic may be integrated into a RAN Intelligent Controller (RIC), which can serve as a standalone programmable component to manage the RAN nodes. Also, for example, custom application-layer services, such as performance measurement and traffic steering applications, may be developed as "plug-n-play" application-layer services (e.g., xApps, rApps, and/or dApps). Data may be exchanged within the data plane, the control plane, and between the data plane and the control plane. Also, for example, data may be exchanged between xApps, rApps, dApps, and/or a combination thereof.

Isolating individual application services from others reduces the chance of unexpected interactions as well as the security risk they may pose to other system components. To accomplish this, software-defined network infrastructure requires each application-layer service to be packaged as a container image (e.g., created with Docker) and deployed with a container orchestration engine and runtime (e.g., Kubernetes).

In a first aspect, a method for identifying one or more potential malicious activities in a software-defined open radio access network is provided. The method includes detecting, by a trusted monitoring device, a communication flow from a sender component to a receiver component via an intermediate component. The method also includes, in response to the detecting of the communication flow, generating, by the trusted monitoring device and utilizing an intermediate identifier associated with the intermediate component, a flow record based on one or more parameters associated with the communication flow. The method further includes providing, by the trusted monitoring device and based on the flow record, an indication of the one or more potential malicious activities in the software-defined open radio access network.

In a second aspect, a computing device for identifying one or more potential malicious activities in a software-defined open radio access network is provided. The computing device includes one or more processors, and data storage. The data storage has stored thereon computer-executable instructions that, when executed by the one or more processors, cause the computing device to carry out operations. The operations include detecting, by a trusted monitoring device, a communication flow from a sender component to a receiver component via an intermediate component. The operations also include, in response to the detecting of the communication flow, generating, by the trusted monitoring device and utilizing an intermediate identifier associated with the intermediate component, a flow record based on one or more parameters associated with the communication flow. The operations further include providing, by the trusted monitoring device and based on the flow record, an indication of the one or more potential malicious activities in the software-defined open radio access network.

In a third aspect, a system for identifying one or more potential malicious activities in a software-defined open radio access network is provided. The system includes a sender component, a receiver component, and an intermediate component. The sender component is configured to communicate with the receiver component via the intermediate component. The system further includes one or more processors, and data storage. The data storage has stored thereon computer-executable instructions that, when executed by the one or more processors, cause the computing device to carry out operations. The operations include detecting, by a trusted monitoring device, a communication flow from the sender component to the receiver component via the intermediate component. The operations also include, in response to the detecting of the communication flow, generating, by the trusted monitoring device and utilizing an intermediate identifier associated with the intermediate component, a flow record based on one or more parameters associated with the communication flow. The operations further include providing, by the trusted monitoring device and based on the flow record, an indication of the one or more potential malicious activities in the software-defined open radio access network.

In a fourth aspect, one or more non-transitory computer readable media for identifying one or more potential malicious activities in a software-defined open radio access network is provided. The one or more non-transitory computer readable media includes computer-readable instructions stored thereon that, when executed by one or more processors of a computing device, cause the computing device to carry out operations. The operations include detecting, by a trusted monitoring device, a communication flow from a sender component to a receiver component via an intermediate component. The operations also include, in response to the detecting of the communication flow, generating, by the trusted monitoring device and utilizing an intermediate identifier associated with the intermediate component, a flow record based on one or more parameters associated with the communication flow. The operations further include providing, by the trusted monitoring device and based on the flow record, an indication of the one or more potential malicious activities in the software-defined open radio access network.

DETAILED DESCRIPTION

Figure 1A:
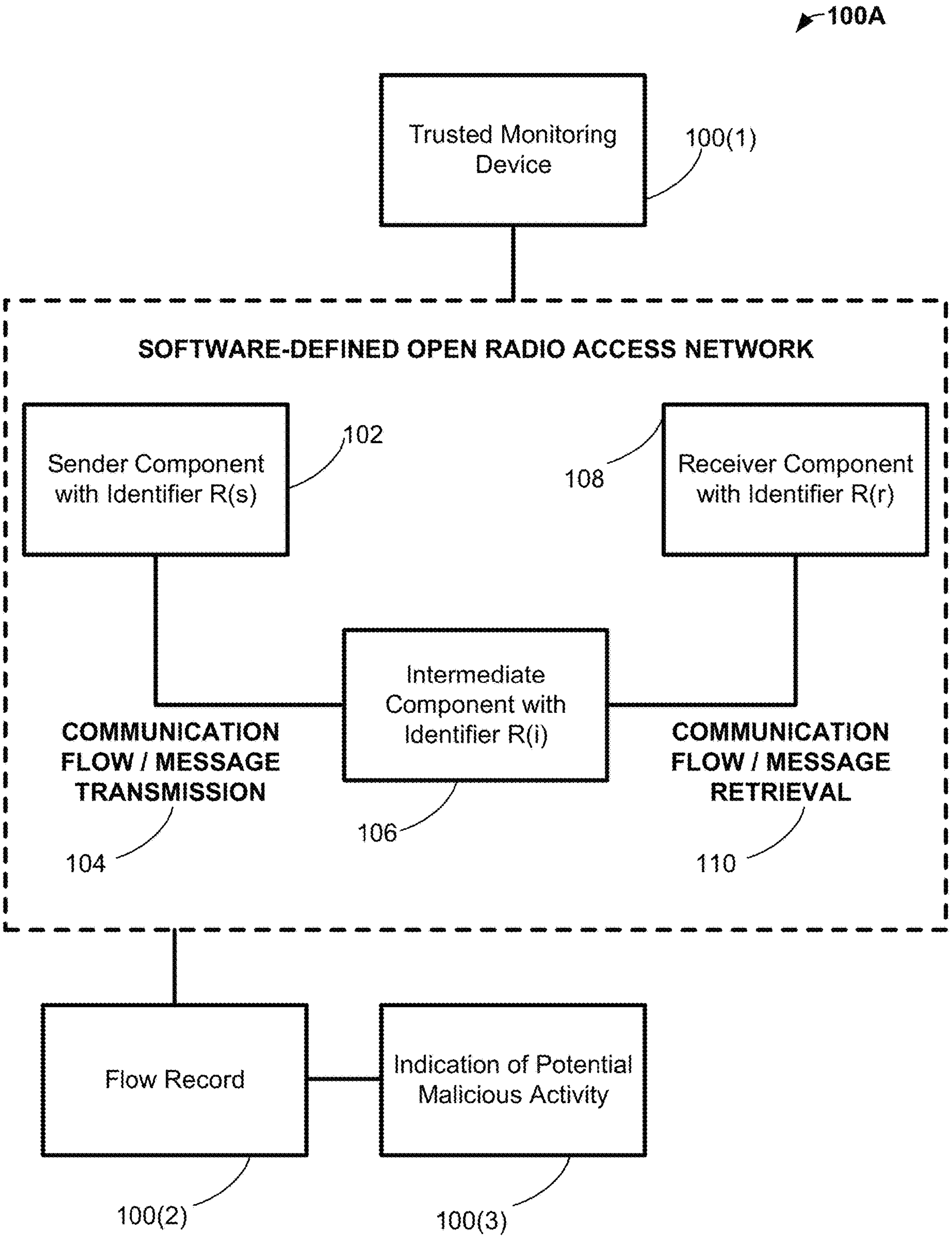
FIG. 1A illustrates an example of communication flow in a network environment, in accordance with example embodiments.

This disclosure describes inventive concepts with reference to specific examples. However, the intent is to cover all modifications, equivalents, and alternatives of the inventive concepts that are consistent with this disclosure. It will be apparent, however, to one of ordinary skill in the art that the present approach can be practiced without these specific details. Thus, the specific details set forth are merely exemplary and are not intended to limit what is presently disclosed. The features implemented in one embodiment may be implemented in another embodiment where logically possible. The specific details can be varied from and still be contemplated to be within the spirit and scope of what is being disclosed.

Isolating individual application-layer services from others reduces the chance of unexpected interactions as well as the security risk they pose to other system components. To accomplish this, the monitoring infrastructure may involve packaging each application-layer service as a container image (e.g., created with Docker) and deployed with a container orchestration engine and runtime (e.g., Kubernetes). However, adversarial actors may leverage an incomplete virtualization of kernel resources and implementation flaws to escape a particular container and gain unauthorized access to network resources.

Techniques described herein may monitor communication flows between applications in a network environment, and detect when a particular communication flow is indicative of malicious activity. For example, network functions complying with network protocols may enable adversarial actors to gain unauthorized access to network resources. In some embodiments, a list of applications authorized to perform a network function may be maintained, and communication flows between applications may be checked to determine whether the applications belong to the list of applications authorized to perform the network function. Similarly, a list of applications not authorized to perform a network function may be maintained, and communication flows between applications may be checked to determine whether the applications belong to the list of applications not authorized to perform the network function.

Example Policy Review Mechanisms

Containers are constructed by virtualizing kernel resources (e.g., using Linux namespace support). This provides a lightweight isolation mechanism at the granularity of individual processes. However, the incomplete virtualization of the kernel and implementation flaws result in attacks that allow an adversary to escape from a container either to the namespace of another container or that of an underlying host.

As described herein, the new system and method, sometimes referred to herein as xIM, aims to monitor when communication flows between the components on a local host or network, a host and a container, two containers, and/or two pods. The choice of which (if any) to monitor is a configuration setting. Such flows can be indicative of security issues, including zero-day container escape attacks. To avoid alerts when legitimate isolation violations occur, the system can be augmented with a whitelist (e.g., components that are allowed) or a blacklist (e.g., components that are not allowed) that can be used to filter out such reports.

The approach based on xIM improves on prior related work PACED (Provenance-based Automated Container Escape Detection, 10th IEEE International Conference on Cloud Engineering, 2022) in several ways.

For example, PACED is based on processing whole-system provenance graphs. This data structure tracks a wide range of activity from all processes across a host. It must therefore impose a commensurate runtime collection overhead. xIM instead limits tracking to a select subset of I/O-related system calls.

As another example, since PACED operates on a whole-system provenance graph, it focuses on a subgraph to identify cases when two communicating processes have different namespace tuples. In PACED, such filtering is generally performed on the entire provenance graph. Thus, all related metadata is operated on, introducing corresponding latency.

Also, for example, CamFlow (Practical Whole-System Provenance Capture, 8th ACM Symposium on Cloud Computing, 2017) is one source of whole-system provenance graphs for PACED. It computes these graphs using Linux Security Module hooks and additional data structures in the kernel. This requires a custom kernel, which may not be a viable option when deploying on base stations in software-defined networks. Another approach is to use a kernel module that interposes on a subset of system calls (including namespace-related ones). This may be performed by redirecting pointers in the system call table. However, some kernels are not configured to support this approach.

As described herein, xIM resolves the afore-mentioned deficiencies by utilizing an approach that can be deployed on the kernels (e.g., without re-compiling them). xIM can be efficiently implemented with various technologies, such as an extended Berkeley Packet Filter (eBPF) or fanotify. For example, eBPF can be configured to run programs in a privileged context (e.g., an operating system kernel). Also, for example, the fanotify API provides notification and interception of file system events. Use cases can include virus scanning and hierarchical storage management.

Generally speaking, a communication flow between two components in a network environment may involve a service model message to be sent over a network. The service model message may depend on a type of component, application service, service model, network environment, and/or a combination thereof. An intermediate component may be configured to receive the service model message from a sender component and make it available to a receiver component. A network monitoring service (e.g., a trusted monitoring device) may maintain a whitelist of application identifiers associated with components that are authorized to provide the service model message, or a blacklist of application identifiers associated with components that are not authorized to provide the service model message. When the receiver component attempts to retrieve the service model message from the intermediate component, the network monitoring service can check whether an identifier associated with the sender component is in the whitelist. If the identifier associated with the sender component is not in the whitelist, that may be indicative of a breach, and one or more security protocols may be triggered. The term "service model message" as used herein may generally refer to any communication between two components in a network environment. For example, the service model message may be a communication flow between components, a network function performed by one component on another, an instruction transmitted from one component to another, and so forth.

For example, for data to flow from one container to another, one or more system calls may occur. For example, a write process may occur from one container to an intermediate component, followed by a read process from that intermediate component by a different container. To track such system processes, a set of writers (e.g., container identifiers) may be maintained for each intermediate component (e.g., an inode). When a read process occurs, the set for that intermediate component may be reviewed to determine if there have been any write processes from other containers. In the event that such a write process has occurred, it may be determined that a container isolation has been breached, unless excluded by a whitelist specification.

Although some example techniques have been described in the context of containers, the techniques are applicable in many settings. For example, the techniques may be used to track pod isolation using control groups or cgroups. A cgroup can be a kernel feature that manages, and/or isolates a compute resource usage (e.g., memory, central processing unit (CPU), disk input/output (I/O), and so forth).

For illustrative purposes, the approach may be described in the context of an operating system, and in terms of two system calls, a write process denoted W and a read process denoted R. The write process may include calls through which a process writes data to an intermediate component (e.g., a file, pipe, and/or a socket), identified by its inode number. Some non-limiting examples of such calls are write( ), writev( ), pwrite( ), and pwritev( ). Some embodiments may involve a data lake of information, and a Kafka queue that monitors events.

Also, for example, containers may use Kubernetes and the intermediate component may be Kubernetes APIs that may not be sockets. In some embodiments, the intermediate component may be a web API. Although the example is illustrated with one intermediate component, in general, a communication flow may involve multiple intermediate components.

The read process may include calls through which a process reads from such resources. Some non-limiting examples of such calls are read( ), readv( ), pread( ), and preadv( ). For notational purposes, w denotes a call in W, and r denotes a call in R.

In the event a call w or r occurs, p may denote an identifier of the process that made the call, and i may denote the inode that was acted upon. In order to generate a unique identifier for each container, a hash of namespace identifiers associated with the container may be determined. Such a hash may be denoted c(p).

The term "identifier" as used herein, may generally refer to any identifier associated with a component. For example, the identifier may be a permanent identifier associated with a network component and may include one or more of an International Mobile Equipment Identity (IMEI), an International Mobile Subscriber Identity (IMSI), or a Subscription Concealed Identifier (SUCI).

Initialization

Upon initialization, a hashmap H (e.g., of key-value pairs) may be generated. A key is generally an inode number i (e.g., of an inode) that has been written to by a container. The value associated with the key is a set C of elements, each of which is an identifier c(p) of a container that has written to the inode i.

Runtime

Call-related events may be efficiently collected and filtered using support in kernels. For example, eBPF programs may be attached to internal trace points. Similarly, the fanotify API provides support for notification when file system events of interest occur. This enables configuration of custom functionality that can run when a call in W or R is executed.

In the event a write process w occurs from container $c(p_w)$, a check may be performed to determine whether the hashmap H includes a key for the inode i that w operated on. In the event that H does not include a key for the inode i, a new entry may be created with i as the key and a new empty set C as the value. Subsequently, the container identifier $c(p_w)$ may be added to C.

In the event a read process r occurs from container $c(p_r)$, a check may be performed to determine if the hashmap H includes a key for the inode i that r operated on. In the event that H does not include a key for the inode i, no further action may be performed. In the event that H includes a key for the inode i, the set C associated with i may be accessed. Each element $c(p_w)$ of C may be a source of a potential cross-container flow via i to $c(p_r)$ via path p. In some embodiments, a triple $<c(p_w), i, c(p_r)>$ may be reported as a potential container isolation breach. In some embodiments, the report may include $<C(p_w), p, i, C(p_r)>$.

Some flows between different tuples of namespaces may be permitted by the security policy of the container engine. Each reported triple may be compared against a whitelist specification. If permitted, processing of the triple stops. Otherwise, a container isolation breach alert notification may be generated. Likewise, some flows between different tuples of namespaces may not be permitted by the security policy of the container engine. In such cases, each reported triple may be compared against a blacklist specification. If not permitted, a container isolation breach alert notification may be generated.

FIG. 1A illustrates an example communication flow 100A in a network environment, in accordance with example embodiments. A sender component 102 (e.g., container with a write identifier $c(p_w)$) may be associated with a sender identifier R(s), and a receiver component 108 (e.g., container with a read identifier $C(p_r)$) may be associated with a receiver identifier R(r). Sender component 102 may initiate a communication flow such as message transmission 104 (e.g., a write process) to intermediate component 106 with intermediate identifier R(i) (e.g., inode number i). Receiver component 108 may initiate a message retrieval 110 (e.g., a read process) from intermediate component 106.

Figure 2:
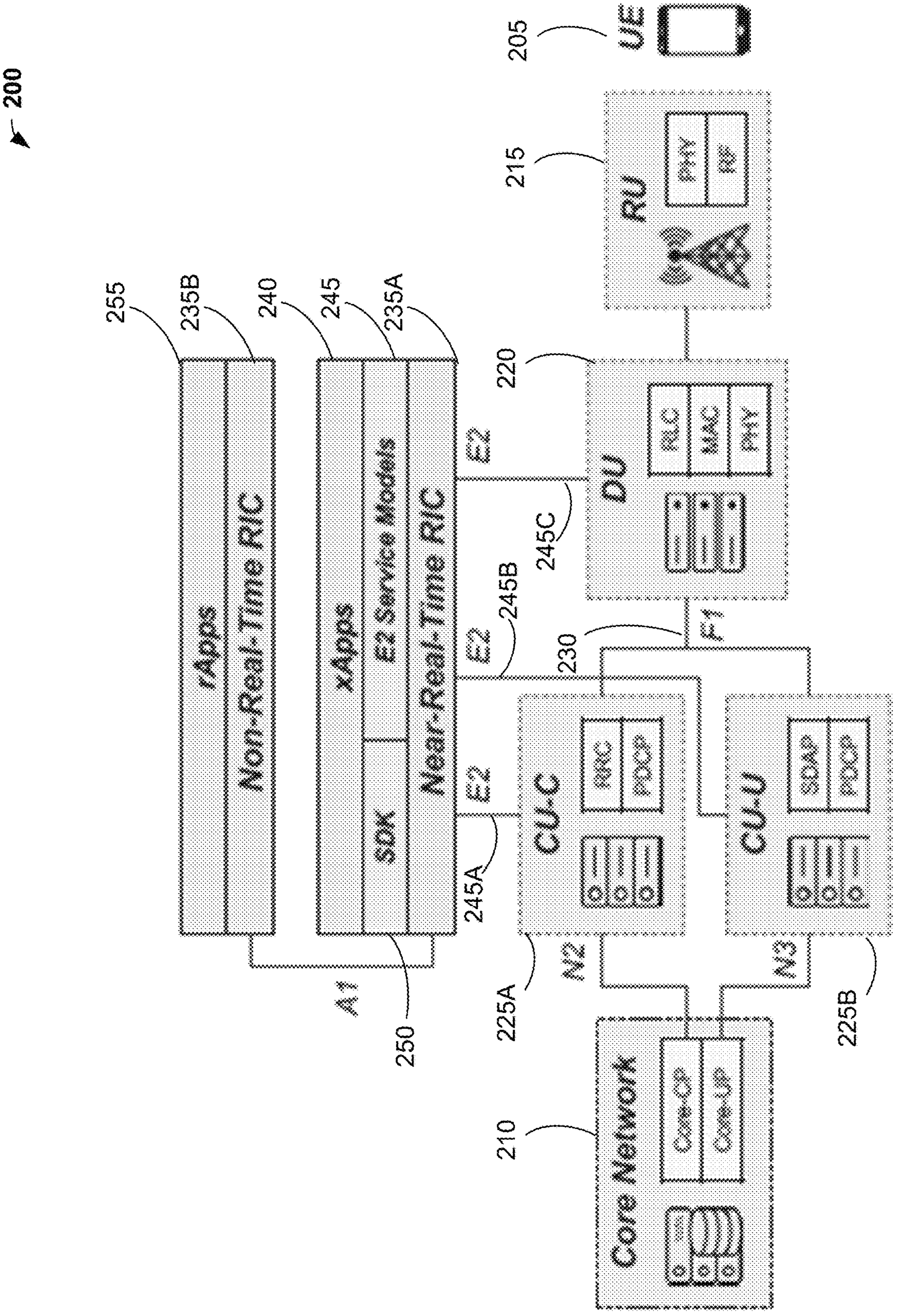
FIG. 2 illustrates an example architecture for a software-defined radio access network (SD-RAN), in accordance with example embodiments.

In some embodiments, the communication flow may be between one or more application services in an application-layer of a control plane of the software-defined open radio access network (see FIG. 2). In some embodiments, the one or more application services may include an xApp, an rApp, a dApp, or a combination thereof. In some embodiments, the communication flow in a software-defined open radio access network may be between one or more components in a control plane, a data plane, a core, or a combination thereof. In some embodiments, the communication flow may include cellular control messages, such as, for example, layer-3 (L3) protocols such as session establishment protocols (e.g., Radio Resource Control (RRC)) and device authentication in mobile protocols (e.g., Non-Access Stratum (NAS)).

For example, the communication flow may include access, by a network function, to one or more components in a service-based architecture platform. For example, a service-based architecture may provide a modular framework within which common applications may be deployed using components from various sources and suppliers. As an example, 3GPP defines a Service-Based Architecture (SBA) to provide control plane functionality using interconnected (e.g., a mesh of) network functions. One or more of such network functions may be configured to access services of other network functions. Some non-limiting examples of such network functions may be an authentication server function (AUSF), a network exposure function (NEF), a network function repository function (NRF), a policy control function (PCF), a network slice selection function (NSSF), unified data managements (UDF), and so forth. Accordingly, communication flows may be related to service discovery, load balancing, encryption, authentication, authorization, employing a sidecar for inter-service communications, and so forth.

In some embodiments, one or more of the sender component 102 or the receiver component 108 may include a virtualized container or a virtualized pod. In some embodiments, one or more of the sender component 102 or the receiver component 108 may include non-virtualized components. For example, sender component 102 may be a non-containerized process and receiver component 108 may be a container or a pod.

In some embodiments, the sender component 102 and the receiver component 108 may be in a same local host in a local network. In some embodiments, the sender component 102 and the receiver component 108 may be in different hosts in a same local network. In some embodiments, the sender component 102 and the receiver component 108 may be in different hosts in different networks.

In some embodiments, the intermediate component 106 may be a file, a pipe, a socket, a Kubernetes application programming interface (API), a web API, or a memory resource.

Trusted monitoring device 100(1) may monitor such communication flows and maintain records related to the components, the flow, the flow path, the data, the message, and so forth. In an operating system, trusted monitoring device 100(1) may be a trusted kernel. In a software-defined network environment, trusted monitoring device 100(1) may be a monitoring system for the network.

In some embodiments, trusted monitoring device 100(1) may detect a communication flow from sender component 102 to receiver component 108 via intermediate component 106. In some embodiments, in response to the detecting of the communication flow, the trusted monitoring device 100 (1) may utilize intermediate identifier R(i) associated with the intermediate component 106, to generate a flow record 100(2) based on one or more parameters associated with the communication flow.

In some embodiments, the intermediate identifier R(i) may be used to look up one or more parameters associated with the communication flow. For example, the one or more parameters may include a group (e.g., a control group or cgroup) associated with the sender component, a prefix of a path of the communication flow, a sender identifier associated with the sender component, a receiver identifier associated with the receiver component, a plain language description of the communication flow, or a combination thereof. For example, the one or more parameters may include a description of the communication flow that is comprehensible to an individual reviewing system alerts or reports. Also, for example, the one or more parameters may include a dynamic mapping from the descriptive (e.g., property) level to a concrete (e.g., identifier) level.

In some embodiments, the intermediate identifier R(i) may be used to look up a whitelist of allowed sender components, or a blacklist of prohibited sender components. Also, for example, the intermediate identifier R(i) may be used to look up one or more policies associated with a component, a communication flow, or both.

In some embodiments, the flow record 100(2) may include respective unique identifiers associated with (1) one or more sender components (e.g., sender component 102)

associated with communication flows via the intermediate component 106, (2) the intermediate component 106, and (3) the receiver component 108. In some embodiments, a given sender identifier associated with a given sender component may be a hash of namespace identifiers associated with the given sender component. Similar considerations may apply to the receiver identifier, the intermediate identifier, and so forth.

In some embodiments, the flow record 100(2) may include information related to data elements transmitted in the communication flow. For example, such information may include actual data elements, their type, size, privacy configurations, security configurations, and so forth. For example, trusted monitoring device 100(1) may be configured to operate on data with high granularity to support fine-grained monitoring, analysis, and/or detection of potentially malicious activities. Trusted monitoring device 100(1) may also be configured to have the extensibility that enables new detection mechanisms to be integrated for both contemporary and emergent network exploits. Also, for example, trusted monitoring device 100(1) may be configured to support the processing of a large volume of communication flows and report of potentially malicious activities in near real-time.

In some embodiments, the flow record 100(2) may include a network flow path for the communication flow. For example, the triple comprising sender component 102, intermediate component 106, and receiver component 108 may represent a temporal snapshot or a portion of a larger path for the communication flow. The communication flow may involve multiple sources and/or destinations, and multiple paths via multiple intermediate components.

In some embodiments, the trusted monitoring device 100(1) may use the flow record 100(2), to provide an indication 100(3) of a potential malicious activity in the software-defined open radio access network. For example, the providing of the indication 100(3) may include providing an identifier associated with a component that is in potential violation of an isolation policy for components in the software-defined open radio access network. Also, for example, the providing of the indication 100(3) may include determining whether the communication flow is in potential violation of a communications policy for allowable communication flows in the software-defined open radio access network.

For example, malicious activities may include attacks, such as, for example, employing a malicious network device, fake base stations, and/or Man-in-the-Middle (MiTM) attacks. Such threats can trigger service outages, privacy leakage, and quality-level downgrades, thereby compromising the security, privacy, and availability of the network for end-users.

Figure 1B:
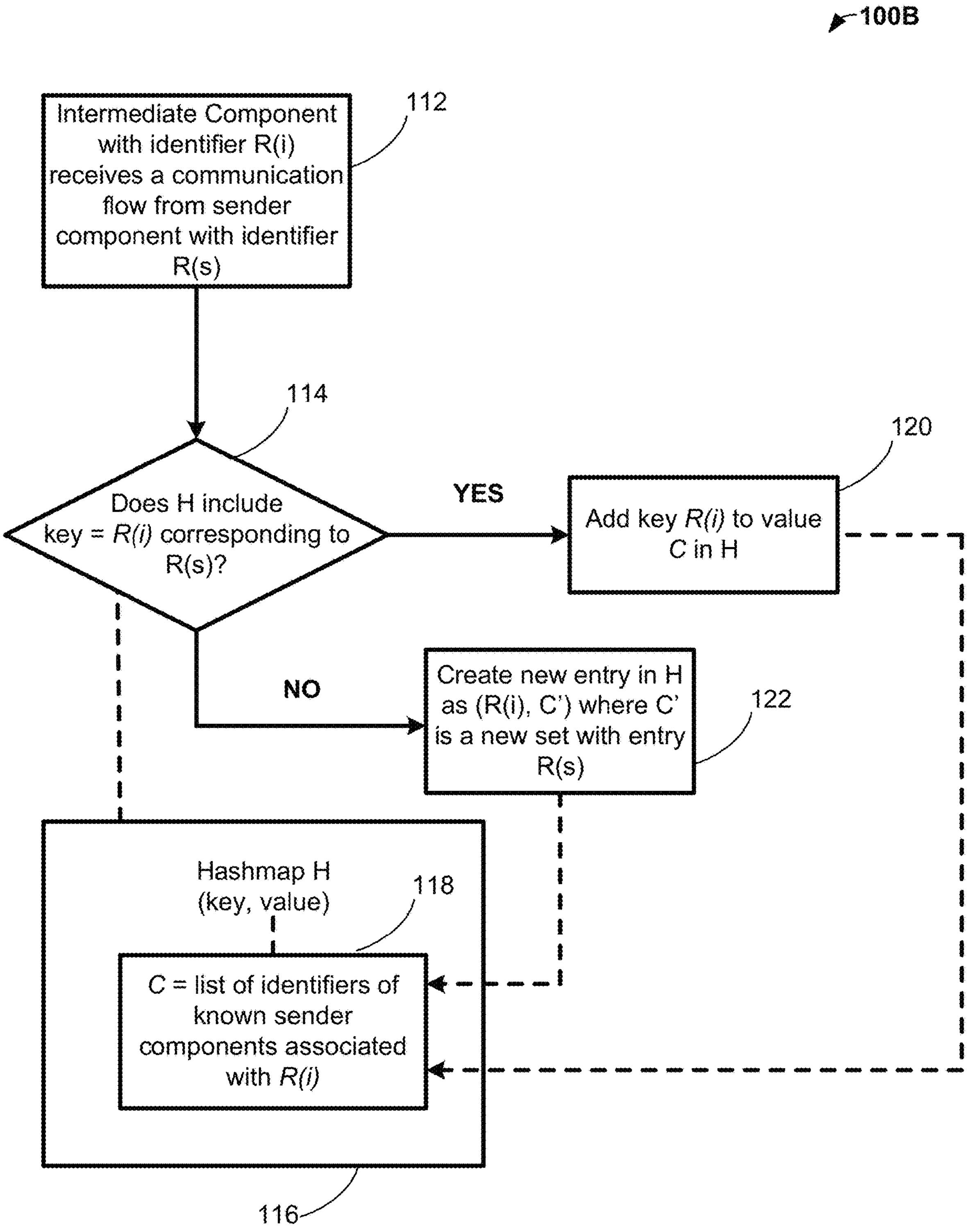
FIG. 1B illustrates an example of resource monitoring for a message transmission process in a network environment, in accordance with example embodiments.

FIG. 1B illustrates an example of resource monitoring for a message transmission process 100B in a network environment, in accordance with example embodiments. At step 112, intermediate component with intermediate identifier R(i) (e.g., inode i) may receive a communication flow from sender component 102 with a sender identifier R(s).

Some embodiments involve detecting a communication flow from a sender component to a receiver component via an intermediate component. Such embodiments involve, in response to the detecting of the communication flow, determining whether an intermediate identifier associated with the intermediate component is in a list of known identifiers (e.g., whitelist or blacklist) corresponding to sender components.

In some embodiments, the determining of whether the intermediate identifier associated with the intermediate component is in the list of known identifiers corresponding to sender components involves accessing a plurality of key-value pairs, wherein a given key of a given key-value pair comprises an identifier associated with a component, and a value of the given key-value pair comprises a collection of sender components associated with sender component that have sent communication flows to the component. Such embodiments involve determining whether the intermediate identifier matches a second key in the second plurality of key-value pairs.

For example, at step 114, it is determined whether the hashmap H 116 includes a key for R(i) that receives the communication flow (e.g., service model message transmission) from sender component 102 with the sender identifier R(s).

Some embodiments involve, upon a determination that the intermediate identifier matches a key in the plurality of key-value pairs, associating the intermediate identifier with the sender identifier in the plurality of key-value pairs. Upon a determination that the hashmap H 116 includes a key for R(i) that receives the communication flow from sender component 102 with the sender identifier R(s), the process proceeds to step 120. At step 120, R(i) is added to value C 118 in H 116. The value C 118 is a list of identifiers of authorized sender components associated with intermediate component with intermediate identifier R(i).

Some embodiments involve, upon a determination that the intermediate identifier does not match a key in the plurality of key-value pairs, generating a new key-value pair, wherein the key is the intermediate identifier, and the value is a collection comprising the sender component. For example, upon a determination that the hashmap H 116 does not include a key for R(i) that receives the communication flow from sender component 102 with the sender identifier R(s), the process proceeds to step 122. At step 122, a new entry is created in H 116. The new entry may be (R(i), C'), where C' is a new collection with entry R(s).

Figure 1C:
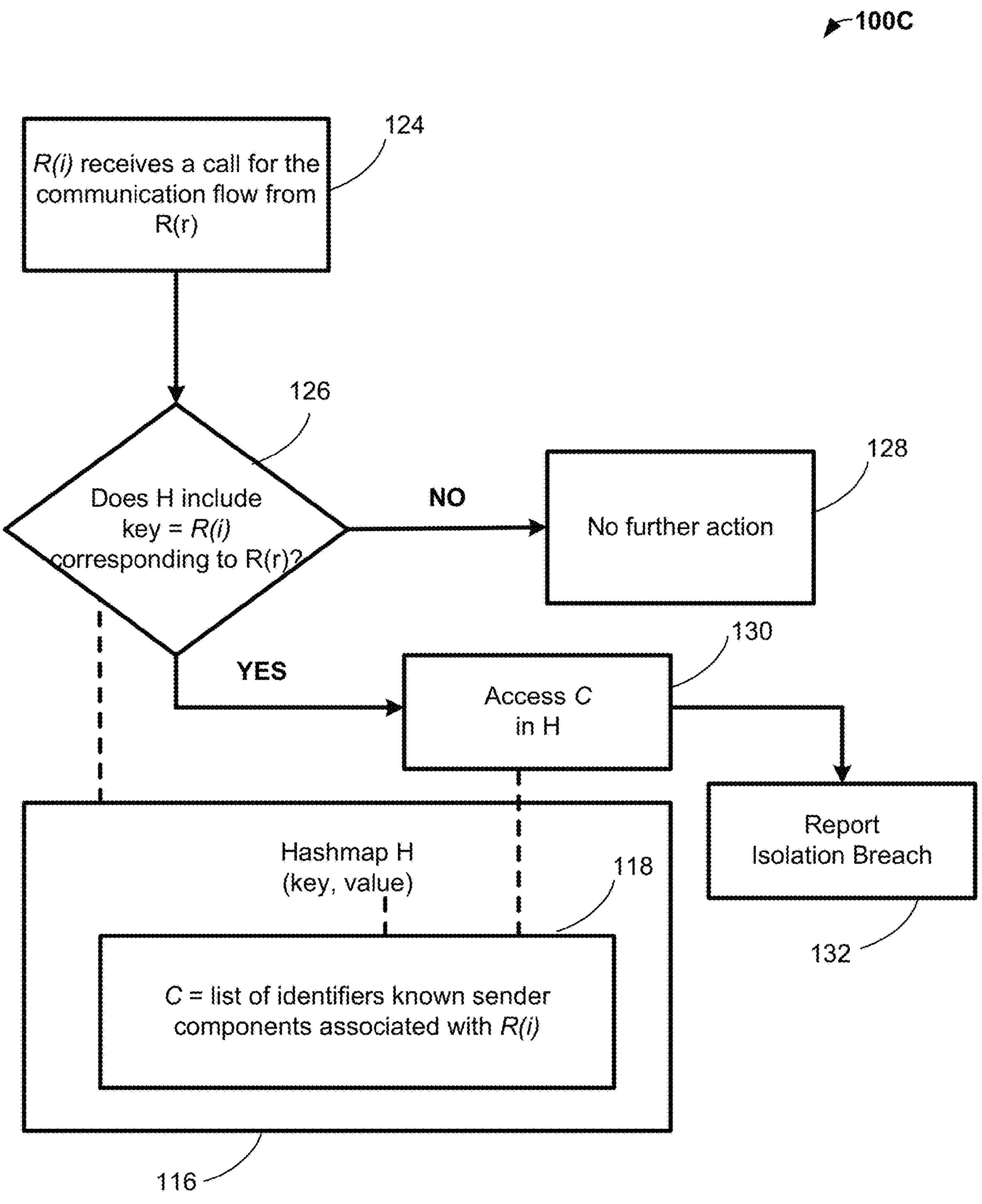
FIG. 1C illustrates an example of resource monitoring for a message retrieval process 100C in a network environment, in accordance with example embodiments.

FIG. 1C illustrates an example of resource monitoring for a message retrieval process 100C in a network environment, in accordance with example embodiments. At step 124, intermediate component with intermediate identifier R(i) may receive a communication flow retrieval request from receiver component 108 with a receiver identifier R(r).

Some embodiments include determining whether the intermediate identifier is in a list of known identifiers corresponding to sender components. Such embodiments involve accessing a plurality of key-value pairs, wherein a given key of a given key-value pair comprises an identifier associated with a given component, and a value of the given key-value pair comprises a collection of sender identifiers associated with sender components that have sent communication flows via the given component. Such embodiments also involve determining that the intermediate identifier matches a key in the plurality of key-value pairs.

For example, at step 126, it is determined whether the hashmap H 116 includes a key for intermediate identifier R(i) that receives the communication flow retrieval request from sender component 102 with the sender identifier R(s).

Upon a determination that the hashmap H 116 does not include a key for the intermediate identifier R(i) that receives the communication flow retrieval request from receiver component 108 with the receiver identifier R(r), the process proceeds to step 128 where no further action is taken.

Upon a determination that the hashmap H 116 includes a key for the intermediate identifier R(i) that receives the communication flow retrieval request from receiver component 108 with the receiver identifier R(r), the process proceeds to step 130. At step 130, the set C 118 associated with intermediate identifier R(i) may be accessed. Each element R(s) of C 118 may be a source of a potential cross-container flow via intermediate identifier R(i) to R(r).

At step 132, an isolation breach may be reported. For example, a list of items associated with the communication flow may be generated. In some embodiments, the list may include, for each intermediate identifier R(i), each sender component that transmits a communication flow to intermediate identifier R(i), each receiver component that attempts to retrieve the communication flow from intermediate identifier R(i), and so forth. In some embodiments, the report may include additional granular information about the data transfer (e.g., information about the communication flow), and/or a path (e.g., network nodes) traversed during the communication flow.

Memory Management

Generally speaking, the data structures H and C may grow arbitrarily large over time. In some network environments, memory resources may need to be limited (e.g., to a fixed maximum size) or otherwise constrained. For example, an embedded system may have limited available memory. Also, for example, eBPF programs use fixed-size data structures.

In such embodiments, when memory resources are constrained, some elements of H and C may be evicted using one or more cache replacement policies (e.g., Least Recently Used (LRU) policy). Such an approach may generate false negatives in container isolation monitoring reports. In some embodiments, the probability of false negatives may be tuned by adjusting the sizes of the data structures H and C. For example, larger values of the sizes of the data structures H and C can reduce the probability of false negatives, at the cost of using more memory. Generally, a cost-benefit approach may be applied to balance a need to reduce false negatives with a need to restrict the sizes of the data structure.

Optional Optimization

The techniques described herein may be extended to track flows through evicted inodes at the cost of false positives. In some embodiments, a Bloom filter B may be maintained. In the event an element is evicted from H, the inode i that is an associated key may be added to B. In the event a read process r were to occur, a check may be performed to determine whether the inode $i_r$ that it operated on is in B. In the event the inode $i_r$ that it operated on is not in B, no further action may be performed.

In the event the inode $i_r$ that it operated on is in B, a further check may be performed to determine whether bits in B other than the ones corresponding to $i_r$ are set. For example, in the event that only the bits corresponding to $i_r$ are set, this may be a result of writes to r from the same container, which would not be a cross-container flow. In this case, a container isolation breach may have been identified.

In some embodiments, the identifiers of the containers from which a write process originated may not be available. Consequently, the whitelist may not be usable. However, in such embodiments, the inode and the reading container of the potential breach may be reported, which may be of use for downstream analysis. In some embodiments, the Bloom filter set membership check may return false positives. However, in such embodiments, the probability of false positives may be tuned by adjusting a size of the Bloom filter.

Example Software-Defined Network Environment

The design of some software-defined networks separates the control plane that manages network topology, from the data plane that performs packet processing and forwarding. Such software-defined networks have programmable components. For example, the control plane logic may be integrated into a RAN Intelligent Controller (RIC), which can serve as a standalone programmable component to manage the RAN nodes. Also, for example, custom application-layer services, such as performance measurement and traffic steering applications, may be developed as "plug-n-play" application-layer services. They may be associated with E2 service models (E2SMs) that provide support for communications with RAN nodes. Based on such an example design, sophisticated analytics may be integrated as xApps into the RIC for a variety of network monitoring and control functions. The techniques described herein may be applicable to a higher generation software-defined network.

The control plane logic of a network determines how data will be routed through it. Since the advent of the Advanced Research Projects Agency Network (ARPANET), this functionality has been implemented in-band, providing flexibility for novel extensions but also vulnerability to unintended manipulation. Software-defined networks amplified these aspects as the logic migrated from hardware to programs in volatile memory. Security services in software-defined networks may be configured to collect data from the network layer, generate a telemetry stream, and enable a modular extension of the control layer functions with new application-layer services capable of monitoring the cellular network, detecting anomalous activity, and/or mitigating such anomalous activity. This may include a wide range of attacks that directly target communications between network devices and base stations. This can enhance the reliability and resilience of higher generation cellular networks against a wide range of attacks and anomalous activity. Also, for example, runtime detection of malicious network devices (e.g., network devices that attempt to interfere in the operations of the base station), and attacks from external transmitters (e.g., transmitters that attempt to disrupt or hijack communications between the base station and the network devices) may be achieved.

For example, a software-defined radio access network (SD-RAN) from the Open Networking Foundation (ONF) implements a cloud-native RAN intelligent controller (RIC), an application-layer services development environment to control open RAN elements such as logical nodes (e.g., RU, DU, and CU). In some embodiments, the RIC may be a near real-time RIC (nRT-RIC). A data-plane security service for software-defined networks may be configured to enable control plane application-layer services (e.g., xApp, rApp, dApp) to counter a wide range of adversarial models against the cellular networks. The communication flow may be a message between one or more of the application-layer services.

FIG. 2 illustrates an example architecture for a software-defined radio access network 200, in accordance with example embodiments.

Data Plane

The software-defined network environment 200 may include a network device such as user equipment (UE) 205 and core network 210 (e.g., Mobility Management Entity/Access and Mobility Management Function (MME/AMF)). The network architecture may incorporate one or more logical nodes including Radio Unit (RU) 215, Distributed Unit (DU) 220, and Central Unit (CU) comprising CU-control (CU-C) 225A and CU-user (CU-U) 225B. The RUs 215 are typical radio hardware deployed in the front-haul network to handle layer-1 (L1) physical radio signals from surrounding user equipment, such as UE 205. The DUs 220 and CUs (e.g., CU-C 225A and CU-U 225B) are logical components that can be hosted at the edge to handle L2 and L3 functions of the cellular protocol. The DU 220 handles L2 functions such as Media Access Control (MAC) and Radio Link Control (RLC). The CU (e.g., CU-C 225A and CU-U 225B) is responsible for L3 control functions such as RRC. For example, CU-C 225A forwards control-plane and CU-U 225B forwards user-plane traffic. Generally, CU-C 225A manages session establishment protocols, and state protocol transitions. Data from the CU-U 225B indicates communications between a user device and other network devices, a state and/or an activity of the central processing unit (CPU) for the device, and so forth. Such data is generally not available from CU-C 225A. The CU-C 225A and CU-U 225B are further attached to core network (CN) 210 functionality, such as the AMF and the User Plane Function (UPF). As an example, open radio access network (O-RAN) data plane components may be connected via standard and open interfaces. For instance, DUs 220 and CUs (e.g., CU-C 225A and CU-U 225B) may be connected by F1 interfaces 230. Also, for example, the N2/N3 interfaces may connect CU-C 225A and CU-U 225B to the core network 210. Additional interfaces may include O1, O2, E1, E2, A1, F1-c, F1-u, X2-c, X2-u, NG-u, NG-c, Xn-u, and so forth. The techniques described herein may be applied to data transfers over such interfaces.

Data from one or both of CU-C 225A and CU-U 225B may be used for effective monitoring of network devices. For example, CU-U 225B may indicate relevant security events for user devices. The combined data from CU-C 225A and CU-U 225B may be used to analyze attacks directed at an SLA. For example, data from CU-C 225A may indicate that a device is performing a series of state transitions, and that the device may be causing a denial-of-service (DoS) attack or a distributed DoS (DDoS) attack against the base station. As these activities may not impact the SLA, such data from CU-C 225A may be ignored for purposes of analyzing a potential anomalous activity involving the SLA. However, data from CU-U 225B regarding the CPU performance and user plane traffic from other devices that are connected to the base station may indicate an impact on the network devices. Also, for example, data from DU 220 can provide metadata indicative of a particular slice a network device may be in communication with. Such data is not available from CU-C 225A or CU-U 225B. Accordingly, attributes from DU 220 may be extracted in order to understand which devices may be associated with which network slices.

Control Plane

The control layer logic may be disaggregated from the data plane based on software-defined network principles. For example, the O-RAN control functions may be realized in the RAN Intelligent Controller (RIC). Based on a latency constraint, RIC may be classified into the near-real-time RIC (nRT-RIC) 235A and non-real-time RIC 235B. Additional and/or alternative types of RIC are possible. For example, Flexible RIC (FlexRIC) is an open source O-RAN nRT-RIC that is implemented in the OpenAirInterface (OAI) radio software suite. FlexRIC may be configured to interface with the OAI radio stack over the O-RAN-defined E2-interface to monitor and control the RAN in real-time.

The control layer logic may be customized with hosted xApps 240. Generally speaking, RIC serves as a proxy for control services and connects to the RAN nodes (e.g., CU-Cs 225A, CU-Us 225B, and DUs 220) via respective E2 interfaces 245A, 245B, and 245C. The interactions between RIC 235 and the RAN nodes (e.g., CU-Cs 225A, CU-Us 225B, and DUs 220) may be defined by E2 operations such as "Report," "Insert," "Control," and "Policy." Based on these operations, xApps 240 may be programmed as "plug-n-play" software on RIC 235. A particular xApp 240 may be configured to define E2 Service Models (E2SMs) 245 as function-specific protocols on top of an E2 Application Protocol (E2AP) to engage with the data plane. Also, for example, xApp 240 can leverage the software-development kit (SDK) 250. In some embodiments, a control loop of an nRT-RIC 235A may complete in approximately 10 milliseconds (ms) to 1000 ms, while non-real-time tasks (e.g., machine learning model training) may be hosted as rApps 255 on the non-real-time RIC 235B with approximately over 1 second (s) latency. Although not shown in FIG. 1, other application-layer services may be implemented as well.

As threats in the cellular networks are likely to continue to evolve, the architecture described herein is extensible for current and future software defined networks, as well as current and future generations of cellular networks.

Example Network Environment

Figure 3:
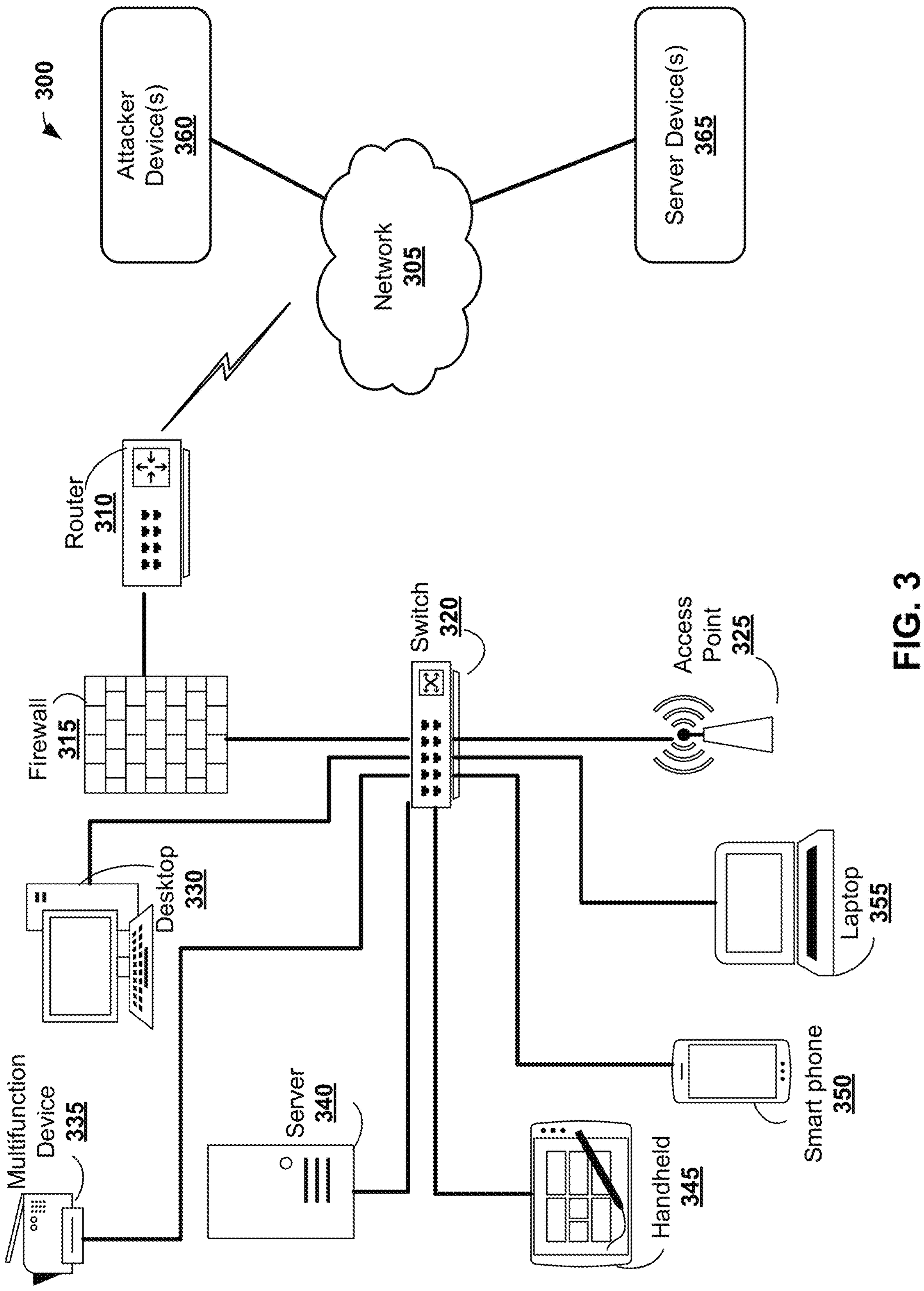
FIG. 3 depicts a network environment, in accordance with example embodiments.

FIG. 3 depicts a network environment 300, in accordance with example embodiments. Network environment 300 includes network 305, attacker device 360, and server device 365, that are configured to communicate, via network 305, with one or more devices such as a desktop 330, a device 335, a server 340, a handheld device 345, a smart phone 350, and/or a laptop 355.

Network 305 may correspond to a local area network (LAN), a wide area network (WAN), a WLAN, a WWAN, a corporate intranet, the public Internet, or any other type of network configured to provide a communications path between networked computing devices. Network 305 may also correspond to a combination of one or more LANs, WANs, corporate intranets, and/or the public Internet.

The network environment 300 may include tens, hundreds, or thousands of devices. In some examples, the one or more devices can be directly connected to network 305. In other examples, the devices can be indirectly connected to network 305 via router 310, firewall 315, network switch 320, and/or access point 325. In this example, router 310, firewall 315, network switch 320, and/or access point 325 can act as an associated computing device to pass electronic communications between the one or more devices and network 305. Although an example physical topology of network 305 is illustrated in FIG. 3, it is understood that network 305 may be associated with a logical topology for communication flow between physical components of network 305.

Network environment 300 may share one or more aspects in common with software-defined network environment 200. For example, network environment 300 may include, among the devices, user equipment (UE) 205. Also, for example, network 305 may share aspects in common with core network 210. As another example, access point 325 may share aspects in common with Radio Unit (RU) 215.

Router 310 can be configured to transmit packets by processing routing information included in a packet (e.g., Internet protocol (IP) data from layer 3). The routing information can be processed via a routing table. Firewall 315 is a network device that can be configured to control network security and access rules. Network switch 320 can be a single switch or an array of switches. Switch 520 is a network device that can be configured to connect various devices on a network, such as, for example, desktop 330, device 335, server 340, handheld device 345, smart phone 350, and/or laptop 355. Switch 520 can use packet switching to receive and forward data between devices in a network. Access point 325 is a network device that can be configured to provide wireless access to various devices on the network.

Server device 365 can be configured to perform one or more services, as requested by the one or more devices. For example, server device 365 can provide content to the one or more devices. The content can include, but is not limited to, content available over the World Wide Web (WWW), content from a dedicated server, software, images, audio, and/or video. The content can include confidential information. Although server 340 is shown as a single server, it can represent a plurality of servers, and/or a data center comprising a plurality of servers.

In some embodiments, attacker device 360 can be a device that performs penetration and intrusion acts that target wireless networks in one or more devices (e.g., network provided by access point 325) to capture and/or intercept information exchanged over the network and/or intrude with the traffic of information.

Figure 4:
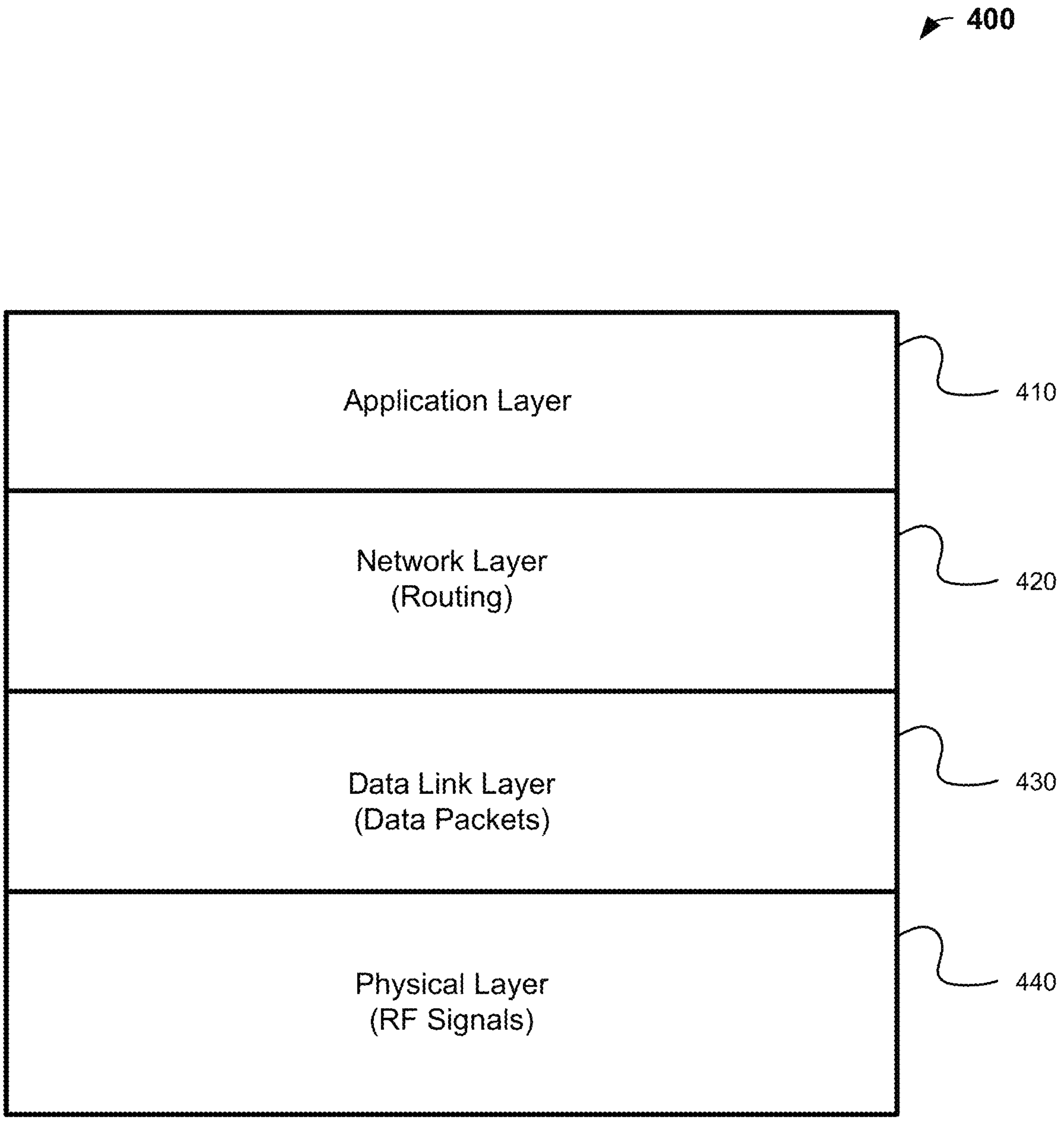
FIG. 4 depicts a protocol stack, in accordance with example embodiments.

FIG. 4 depicts a protocol stack 400, in accordance with example embodiments. The protocol stack 400 enables nodes in a packet-switched network (e.g., network environment 300) to communicate with one another. The term "node" can refer to any computing device in a network, including wireless access points, wireless devices, etc. Protocols that implement a packet-switched network divide messages into packets before the messages are sent. Each packet contains the source and destination addresses and the data. Each packet is then transmitted individually and can follow different routes to its destination. The original message is recompiled at the destination after all the packets forming the message arrive.

Network communication among the nodes (and wireless access points) is generally conceptualized in terms of protocol layers, such as the physical layer 440, data link layer 430, network layer 420, and application layers 410, and such protocol layers form a protocol stack 400. In general, the protocol layers exchange control and status information with one another. For a node transmitting a communication, control starts at the application layer 410 and passes layer by layer to the physical layer 440, which sends the communication over a communication link to a receiving node. The receiving node processes the communication, layer by layer, up the stack of protocol layers, starting at the physical layer 440 and ending at the application layer 410. It is to be understood that the protocol stack 400 can have additional protocol layers to those shown, such as a transport layer. The protocol used at the physical layer 440 of the protocol stack 400 accommodates the type of physical medium over which the nodes communicate. The physical layer 440 conveys the bit stream in the radio signal through the network environment 300 at the electrical and mechanical level, and provides the hardware means of sending and receiving data.

In one embodiment, the nodes in network environment 300 communicate with each other over links using an IEEE 802.11 wireless communications standard (e.g., IEEE 802.11(a), IEEE 802.11(b), and IEEE 802.11(g)). Other embodiments of wireless communications standards that can be used by the nodes include BLUETOOTH, HYPERLAN, and HomeRF. For a node operating according to the IEEE 802.11, the physical layer 440 specifies the physical aspects of the radio signaling (e.g., frequency hopping spread spectrum (FHSS), and direct sequence spread spectrum (DSSS)).

The data link layer 430 encodes and decodes data packets into bits and handles errors in the physical layer 440, flow control and frame synchronization. In one embodiment, the data link layer 430 comprises two sub-layers: a Logical Link Control (LLC) layer and a Media Access Control (MAC) layer (the lower of the two sub-layers). The MAC sub-layer controls access to the physical transmission medium; the LLC layer controls frame synchronization, flow control, and error checking. The network (or routing) layer 420 provides a protocol for forwarding and routing packets through the network environment 300, by creating logical paths for transmitting packets from node to node.

Example Computing Devices

Computing devices typically include a variety of computing machine-readable media. Machine-readable media can be any available media that can be accessed by computing device and includes both volatile and nonvolatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device. Transitory media such as wireless channels are not included in the machine-readable media. Machine-readable media typically embody computer readable instructions, data structures, and other executable software.

In an example, the volatile memory can store portions of the operating system, application programs, other executable software, and program data.

A user may enter commands and information into the computing device through input devices such as a keyboard, touchscreen, or software or hardware input buttons, a microphone, a pointing device and/or scrolling input component, such as a mouse, trackball or touchpad. The microphone can cooperate with speech recognition software. These and other input devices are often connected to the processing unit through a user input interface that is coupled to the system bus but can be connected by other interface and bus structures, such as a lighting port, game port, or a universal serial bus (USB). A display monitor or other type of display screen device is also connected to the system bus via an interface, such as a display interface. In addition to the monitor, computing devices may also include other peripheral output devices such as speakers, a vibration device, and other output devices, which may be connected through an output peripheral interface.

The computing device can operate in a networked environment using logical connections to one or more remote computers/client devices, such as a remote computing system. The remote computing system can be a personal computer, a mobile computing device, a server, a router, a network PC, a peer device or other common network node, and typically includes many or all of the elements described above relative to the computing device. The logical connections can include a personal area network (PAN) (e.g., Bluetooth®), a local area network (LAN) (e.g., Wi-Fi), and a wide area network (WAN) (e.g., cellular network), but may also include other networks such as a personal area network (e.g., Bluetooth®). Such networking environments are commonplace in offices, enterprise-wide computer networks, intranets and the Internet. A browser application and/or one or more local apps may be resident on the computing device and stored in the memory.

When used in a LAN networking environment, the computing device may be connected to the LAN through a network interface, which can be, for example, a Bluetooth® or Wi-Fi adapter. When used in a WAN networking environment (e.g., Internet), the computing device typically includes some means for establishing communications over the WAN. With respect to mobile telecommunication technologies, for example, a radio interface, which can be internal or external, can be connected to the system bus via the network interface, or other appropriate mechanism. In a networked environment, other software depicted relative to the computing device, or portions thereof, may be stored in the remote memory storage device. By way of example, and not limitation, remote application programs may reside on a remote computing device. It will be appreciated that the network connections shown are examples and other means of establishing a communications link between the computing devices that may be used.

Figure 5:
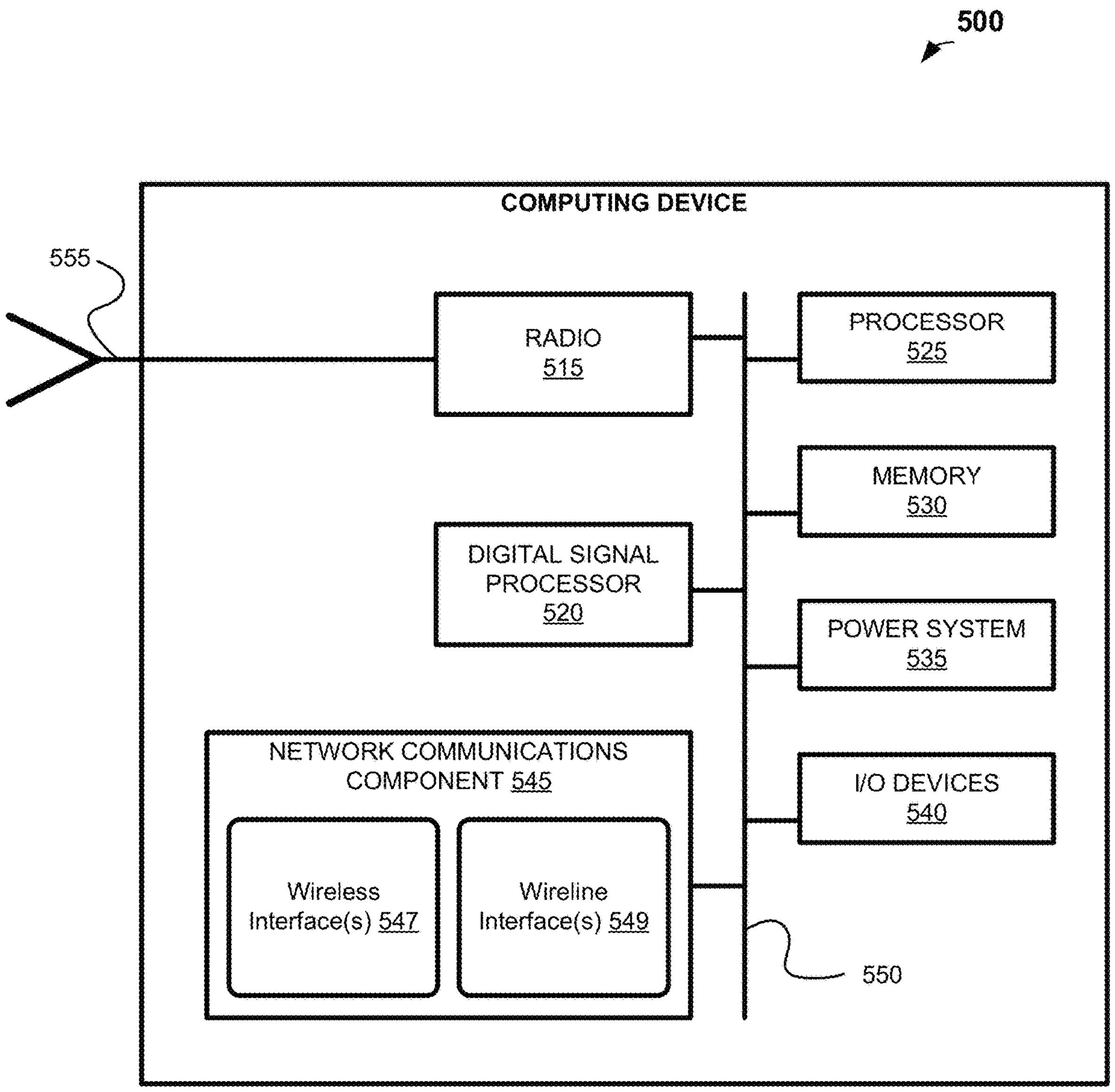
FIG. 5 is a block diagram of an example computing device, in accordance with example embodiments.

FIG. 5 is a block diagram of an example computing device 500, in accordance with example embodiments. Computing device 500 can include a radio 515, a digital signal processor 520, one or more processors 525, memory 530, power system 535, input/output devices 540, and network communications component 545, all of which may be linked together via a system bus, network, or other connection mechanism 550, and an antenna 555 to communicate with a wireless access point. Computing device 500 can be one or more of the devices described with reference to FIG. 3 (e.g., desktop 330, a device 335, a server 340, a handheld device 345, a smart phone 350, and/or a laptop 355).

Radio 515 may be a single physical layer (L1) interface that enables access to wireless media. A software driver can implement Media Access Control (MAC) functionality at layer-2 (L2) of an Open System Interconnect (OSI) standard to instantiate multiple simultaneous virtual network interfaces. Radio 515 may be coupled to antenna 555. A Digital Signal Processor (DSP) 520 may be coupled to the radio 515 and a Central Processing Unit (e.g., processor 525). A media access controller (MAC) may be a separate chip or may be integrated into processor 525.

One or more processors 525 can include one or more general purpose processors, and/or one or more special purpose processors (e.g., digital signal processors, graphics processing units (GPUs), application specific integrated circuits, etc.). One or more processors 525 can be configured to execute computer-readable instructions that are contained in memory 530 and/or other instructions as described herein.

Memory 530 can include one or more non-transitory computer-readable storage media that can be read and/or accessed by at least one of one or more processors 525. The one or more computer-readable storage media can include volatile and/or non-volatile storage components, such as optical, magnetic, organic or other memory or disc storage, which can be integrated in whole or in part with at least one of one or more processors 525. In some examples, memory 530 can be implemented using a single physical device (e.g., one optical, magnetic, organic or other memory or disc storage unit), while in other examples, memory 530 can be implemented using two or more physical devices.

Power system 535 can include one or more batteries and/or one or more external power interfaces for providing electrical power to computing device 500. One or more external power interfaces of power system 535 can include one or more wired-power interfaces, such as a USB cable and/or a power cord, that enable wired electrical power connections to one or more power supplies that are external to computing device 500.

Input/output devices 540 may include storage devices, a receiver, a transmitter, a speaker, a display, an image capturing component, an audio recording component, a user input device (e.g., a keyboard, a mouse, a microphone), and so forth. Although not shown in FIG. 5, one or more of I/O devices 540 may be a device external to computing device 500. Such an external device may communicate with computing device 500 via a wired or wireless connection, and such communication may be facilitated by an I/O interface of computing device 500.

Network communications component 545 can include one or more devices that provide one or more wireless interfaces 547 and/or one or more wireline interfaces 549 that are configurable to communicate via a network. Wireless interface(s) 547 can include one or more wireless transmitters, receivers, and/or transceivers, such as a Bluetooth™ transceiver, a Wi-Fi™ transceiver, an LTE™ transceiver, and/or other type of wireless transceiver configurable to communicate via a wireless network. Wireline interface (s) 549 can include one or more wireline transmitters, receivers, and/or transceivers, such as an Ethernet transceiver, a Universal Serial Bus (USB) transceiver, or similar transceiver configurable to communicate via a physical connection to a wireline network.

Network communications component 545 can be configured to provide reliable, secured, and/or authenticated communications between various components. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information). Communications can be made secure (e.g., be encoded or encrypted) and/or decrypted/decoded using one or more cryptographic protocols and/or algorithms, such as, but not limited to, a secure sockets protocol such as Secure Sockets Layer (SSL), and/or Transport Layer Security (TLS).

Example Methods of Operation

Figure 6:
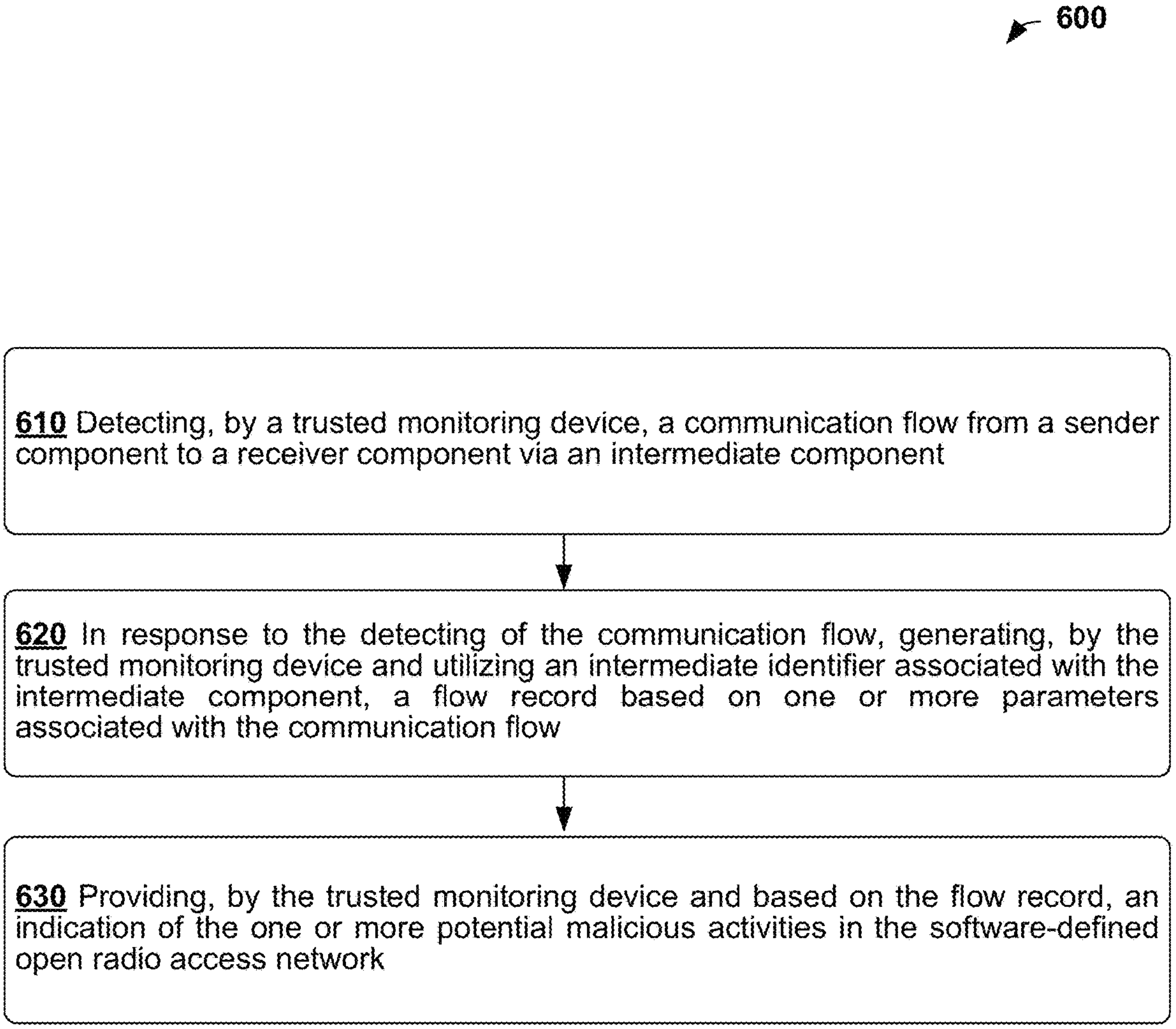
FIG. 6 illustrates an example method, in accordance with example embodiments.

FIG. 6 illustrates an example method 600, in accordance with example embodiments. Method 600 may include various blocks or steps. The blocks or steps may be carried out individually or in combination. The blocks or steps may be carried out in any order and/or in series or in parallel. Further, blocks or steps may be omitted or added to method 600.

The blocks of method 600 for identifying one or more potential malicious activities in a software-defined open radio access network may be carried out by various elements of computing device 500 as illustrated and described in reference to FIG. 5.

Block 610 includes detecting, by a trusted monitoring device, a communication flow from a sender component to a receiver component via an intermediate component.

Block 620 includes, in response to the detecting of the communication flow, generating, by the trusted monitoring device and utilizing an intermediate identifier associated with the intermediate component, a flow record based on one or more parameters associated with the communication flow.

Block 630 includes providing, by the trusted monitoring device and based on the flow record, an indication of the one or more potential malicious activities in the software-defined open radio access network.

In some embodiments, the providing of the indication includes providing an identifier associated with a component that is in potential violation of an isolation policy for components in the software-defined open radio access network.

Some embodiments include determining whether the communication flow is in potential violation of a communications policy for allowable communication flows in the software-defined open radio access network.

In some embodiments, the flow record includes respective unique identifiers associated with (1) one or more sender components associated with communication flows via the intermediate component, (2) the intermediate component, and (3) the receiver component. In some embodiments, a given sender identifier associated with a given sender component may be a hash of namespace identifiers associated with the given sender component.

In some embodiments, the flow record includes information related to data elements transmitted in the communication flow. In some embodiments, the flow record includes a network flow path for the communication flow.

In some embodiments, the one or more parameters associated with the communication flow includes a group associated with the sender component, a prefix of a path of the communication flow, a sender identifier associated with the sender component, a receiver identifier associated with the receiver component, a plain language description of the communication flow, or a combination thereof.

In some embodiments, the sender component and the receiver component may be in a same local host in a local network.

In some embodiments, the communication flow may be between one or more application services in an application-layer of a control plane of the software-defined open radio access network. In some embodiments, the one or more application services may include an xApp, an rApp, a dApp, or a combination thereof.

In some embodiments, the communication flow includes access, by a network function, to one or more components in a service-based architecture platform. In some embodiments, the communication flow may be between one or more components in a control plane, a data plane, or a core of the software-defined open radio access network.

In some embodiments, the software-defined open radio access network is a higher generation cellular network.

In some embodiments, one or more of the sender component or the receiver component may include a virtualized container or a virtualized pod.

In some embodiments, the intermediate component may be a file, a pipe, a socket, a Kubernetes application programming interface (API), a web API, or a memory resource.

In some embodiments, the communication flow includes a function call in an operating system. For example, sending of the communication flow involves a write process that writes data to the intermediate component. Also, for example, retrieval of the communication flow involves a read process that reads data from the intermediate component.

Some embodiments include determining whether the intermediate identifier is in a list of known identifiers corresponding to sender components. Such embodiments involve accessing a plurality of key-value pairs, wherein a given key of a given key-value pair comprises an identifier associated with a given component, and a value of the given key-value pair comprises a collection of sender identifiers associated with sender components that have sent communication flows via the given component. Such embodiments also involve determining that the intermediate identifier matches a key in the plurality of key-value pairs.

Some embodiments involve detecting a second communication flow from a second sender component to a second receiver component via a second intermediate component. Such embodiments involve, in response to the detecting of the second communication flow, determining whether a second intermediate identifier associated with the second intermediate component is in a second list of known identifiers corresponding to second sender components.

In some embodiments, the determining of whether the second intermediate identifier associated with the second intermediate component is in the second list of known identifiers corresponding to second sender components involves accessing a second plurality of key-value pairs, wherein a given key of a given key-value pair comprises an identifier associated with a component, and a value of the given key-value pair comprises a collection of second sender components associated with second sender component that have sent communication flows to the component. Such embodiments involve determining whether the second intermediate identifier matches a second key in the second plurality of key-value pairs.

Some embodiments involve, upon a determination that the second intermediate identifier does not match a second key in the plurality of key-value pairs, generating a new key-value pair, wherein the key is the second intermediate identifier, and the value is a collection comprising the sender component.

Some embodiments involve, upon a determination that the second intermediate identifier matches a second key in the plurality of key-value pairs, associating the second intermediate identifier with the sender identifier in the plurality of key-value pairs.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information and/or comparison of signals can correspond to circuitry that can be configured to perform the specific logical functions of a herein-described method or technique. Alternatively or additionally, a step or block that represents a processing of information and/or comparison of signals can correspond to a component, a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A component may be implemented in hardware electronic components, software components, and a combination of both.

Generally, applications include programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method for identifying one or more potential malicious activities in a software-defined open radio access network, comprising:

detecting, by a trusted monitoring device, a communication flow from a sender component to a receiver component via an intermediate component, wherein detecting the communication flow comprises detecting a read process by the receiver component to retrieve data from the intermediate component;

in response to the detecting of the communication flow, generating, by the trusted monitoring device and utilizing an intermediate identifier associated with the intermediate component, a flow record based on one or more parameters associated with the communication flow, wherein generating the flow record comprises identifying the sender component from a record of components that previously executed a write process to the intermediate component; and providing, by the trusted monitoring device and based on the flow record, an indication of the one or more potential malicious activities in the software-defined open radio access network.

2. The computer-implemented method of claim 1, wherein the providing of the indication comprises:

providing an identifier associated with a component that is in potential violation of an isolation policy for components in the software-defined open radio access network.

3. The computer-implemented method of claim 1, further comprising:

determining whether the communication flow is in potential violation of a communications policy for allowable communication flows in the software-defined open radio access network.

4. The computer-implemented method of claim 1, wherein the flow record comprises respective unique identifiers associated with (1) one or more sender components associated with communication flows via the intermediate component, (2) the intermediate component, and (3) the receiver component.

5. The computer-implemented method of claim 1, wherein the flow record comprises information related to data elements transmitted in the communication flow.

6. The computer-implemented method of claim 1, wherein the one or more parameters associated with the communication flow comprise a group associated with the sender component, a prefix of a path of the communication flow, a sender identifier associated with the sender component, a receiver identifier associated with the receiver component, a plain language description of the communication flow, or a combination thereof.

7. The computer-implemented method of claim 1, wherein the sender component and the receiver component are in a same local host in a local network.

8. The computer-implemented method of claim 1, wherein the communication flow is between one or more application services in an application-layer of a control plane of the software-defined open radio access network.

9. The computer-implemented method of claim 1, wherein the communication flow comprises access, by a network function, to one or more components in a service-based architecture platform.

10. The computer-implemented method of claim 1, wherein the software-defined open radio access network is a higher generation cellular network.

11. The computer-implemented method of claim 1, wherein one or more of the sender component or the receiver component comprises a virtualized container or a virtualized pod.

12. The computer-implemented method of claim 1, wherein the intermediate component comprises a file, a pipe, a socket, a Kubernetes application programming interface (API), a web API, or a memory component.

13. The computer-implemented method of claim 1, wherein the communication flow comprises a function call in an operating system.

14. The computer-implemented method of claim 1, further comprising:

determining whether the intermediate identifier is in a list of known identifiers corresponding to sender components by:

accessing a plurality of key-value pairs, wherein a given key of a given key-value pair comprises an identifier associated with a given component, and a value of the given key-value pair comprises a collection of sender identifiers associated with sender components that have sent communication flows via the given component; and determining that the intermediate identifier matches a key in the plurality of key-value pairs.

15. A system for identifying one or more potential malicious activities in a software-defined open radio access network, comprising:

a sender component, a receiver component, and an intermediate component, wherein the sender component is configured to communicate with the receiver component via the intermediate component;

one or more processors; and data storage, wherein the data storage has stored thereon computer-executable instructions that, when executed by the one or more processors, cause a computing device to carry out operations comprising:

detecting, by a trusted monitoring device, a communication flow from the sender component to the receiver component via the intermediate component, wherein detecting the communication flow comprises detecting a read process by the receiver component to retrieve data from the intermediate component;

in response to the detecting of the communication flow, generating, by the trusted monitoring device and utilizing an intermediate identifier associated with the intermediate component, a flow record based on one or more parameters associated with the communication flow, wherein generating the flow record comprises identifying the sender component from a record of components that previously executed a write process to the intermediate component; and providing, by the trusted monitoring device and based on the flow record, an indication of the one or more potential malicious activities in the software-defined open radio access network.

16. The system of claim 15, wherein the operations for providing the indication comprise operations for providing an identifier associated with a virtualized component that is in potential violation of an isolation policy for components in the software-defined open radio access network.

17. The system of claim 15, the operations further comprising:

determining whether the communication flow is in potential violation of an isolation policy for allowable communication flows in the software-defined open radio access network.

18. The system of claim 15, wherein the flow record comprises respective unique identifiers associated with (1) one or more sender components associated with communication flows via the intermediate component, (2) the intermediate component, and (3) the receiver component.

19. The system of claim 15, wherein the communication flow is between one or more application services in an application-layer of a control plane of the software-defined open radio access network.

20. The system of claim 15, wherein the communication flow comprises access, by a network function, to one or more components in a service-based architecture platform.

21. The system of claim 15, comprising operations for:

determining whether the intermediate identifier is in a list of known identifiers by:

accessing a plurality of key-value pairs, wherein a given key of a given key-value pair comprises an identifier associated with a given virtualized component, and a value of the given key-value pair comprises a collection of sender identifiers associated with sender virtualized components that have sent communication flows via the given virtualized component; and determining that the intermediate identifier matches a key in the plurality of key-value pairs.

22. A computing device for identifying one or more potential malicious activities in a software-defined open radio access network, comprising:

one or more processors; and data storage, wherein the data storage has stored thereon computer-executable instructions that, when executed by the one or more processors, cause the computing device to carry out operations comprising:

detecting, by a trusted monitoring device, a communication flow from a sender component to a receiver component via an intermediate component, wherein detecting the communication flow comprises detecting a read process by the receiver component to retrieve data from the intermediate component;

in response to the detecting of the communication flow, generating, by the trusted monitoring device and utilizing an intermediate identifier associated with the intermediate component, a flow record based on one or more parameters associated with the communication flow, wherein generating the flow record comprises identifying the sender component from a record of components that previously executed a write process to the intermediate component; and providing, by the trusted monitoring device and based on the flow record, an indication of the one or more potential malicious activities in the software-defined open radio access network.

23. One or more non-transitory computer readable media, for identifying one or more potential malicious activities in a software-defined open radio access network, having computer-readable instructions stored thereon that, when executed by one or more processors of a computing device, cause the computing device to carry out operations comprising:

detecting, by a trusted monitoring device, a communication flow from a sender component to a receiver component via an intermediate component, wherein detecting the communication flow comprises detecting a read process by the receiver component to retrieve data from the intermediate component;

in response to the detecting of the communication flow, generating, by the trusted monitoring device and utilizing an intermediate identifier associated with the intermediate component, a flow record based on one or more parameters associated with the communication flow, wherein generating the flow record comprises identifying the sender component from a record of components that previously executed a write process to the intermediate component; and providing, by the trusted monitoring device and based on the flow record, an indication of the one or more potential malicious activities in the software-defined open radio access network.

* * * * *